United States Patent [19]
Tarello

[11] 3,792,627
[45] Feb. 19, 1974

[54] ADJUSTABLE CAM ASSEMBLY
[75] Inventor: William Robert Tarello, Rockville, Md.
[73] Assignee: Survival Technology, Inc., Bethesda, Md.
[22] Filed: June 21, 1973
[21] Appl. No.: 372,297

[52] U.S. Cl. ............................................ 74/568 FS
[51] Int. Cl. ............................................ F16h 53/00
[58] Field of Search......... 74/568 FS, 568 M, 568 T, 74/568 R

[56] References Cited
UNITED STATES PATENTS
2,945,397    7/1960    Caler et al...................... 74/568 FS
3,680,406    8/1972    Bush............................... 74/568 FS Primary Examiner—Benjamin W. Wyche
Assistant Examiner—F. D. Shoemaker
Attorney, Agent, or Firm—Witherspoon and Lane

[57] ABSTRACT

An adjustable cam assembly wherein the adjustable cam element is a spring strip element having provision for adjustment of length and position of said element to thereby control the cam contour.

4 Claims, 5 Drawing Figures 3,792,627

ADJUSTABLE CAM ASSEMBLY

SUMMARY OF THE INVENTION

This invention relates to an adjustable cam assembly and more particularly to a device wherein the adjustable cam element is a spring strip element having two types of adjustability.

The need and commercial advantages to be derived from an adjustable cam assembly are immediately obvious. Many different types of adjustable cam assemblies have been devised; however, in most instances they were for specific mechanical operations. On the other hand, it would be desirable to have an adjustable cam which is a somewhat universal device susceptible of very fine adjustment to provide required accuracy.

In view of the above, it is an object of this invention to provide an adjustable cam assembly of universal nature with rapid and accurate adjustability.

It is another object of this invention to provide an adjustable cam assembly wherein the adjustable cam element is both resilient and strong so that adjustments may be made and retained for continuous operation.

It is yet another object of this invention to provide an adjustable cam assembly wherein the contour of the adjustable cam element is varied by changing the length of the element between its fixed and movable mounting means and also by changing the distance between the aforesaid fixed and movable mounting means.

It is a still further object of this invention to provide an adjustable cam assembly including a semi-circular cam plate, a hub affixed to the cam plate for rotatably mounting same, a strip spring cam element adjustably mounted on the cam plate, the cam plate having a longitudinal slot therein with a threaded adjusting rod rotatably carried on the cam plate parallel with the longitudinal slot, a cam block assembly threadedly mounted on the adjusting rod for reciprocation thereon, one end of the cam element being affixed to the cam plate, the other end being adjustably fastened to the cam block assembly whereby the contour of the cam element may be varied by changing the length of the cam element between its fixed point and the cam block assembly and by the position of the cam block assembly on the adjusting rod.

IN THE DRAWINGS

FIG. 1 is a perspective view of the adjustable cam assembly,

FIG. 2 is an elevational view of the adjustable cam assembly shown with a cam followed bearing on the cam element, FIG. 3 is a cross-sectional view taken along line 3—3 of FIG. 2 illustrating the manner in which the cam blaock assembly is mounted on the cam plate, FIG. 4 is a cross-sectional view taken along line 4—4 of FIG. 2 showing the hub mounting for the cam plate, and FIG. 5 is a top plan view illustrating the relationship of the adjustable spring cam element to the cam plate and the rotatable adjusting rod.

DETAILED DESCRIPTION OF THE INVENTION

Figure 1:
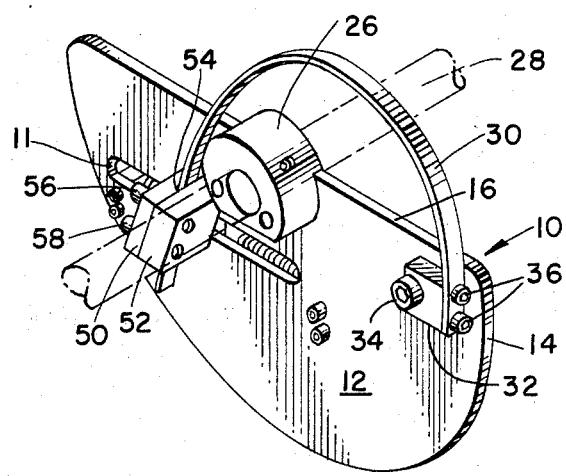

As illustrated in the various figures of the drawing, the adjustable cam assembly 10 comprises a generally semi-circular cam plate 12 having a circular peripheral edge 14 and a connecting straight almost diametrical edge 16. The cam plate 12 is provided with a longitudinal slot 18 with a threaded adjusting rod 20 rotatably mounted on the cam plate parallel with slot 18 by means of mounting brackets 22 and 24. A hub 26 is centrally affixed to cam plate 12 to rotatably carry said plate on a shaft 28 shown in phantom.

The adjustable spring strip cam element 30 has one end secured to the cam plate 12 adjacent the cam plate periphery 14 by means of mounting block 32 held onto plate 12 by bolt assembly 34. The cam element 30 is fastened to block 30 by means of screws 36-36.

Figure 2:
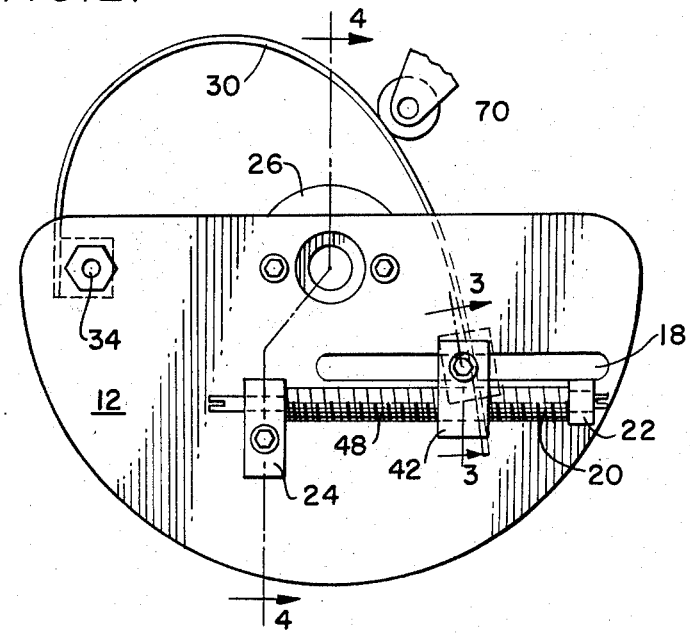
Figure 3:
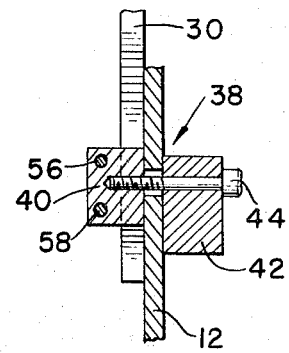
Figure 4:
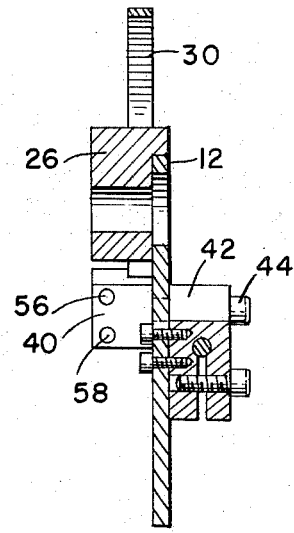
Figure 5:
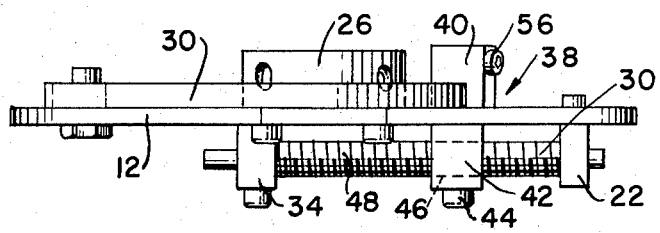

The cam block assembly 38 comprises a cam block head 40 and a cam block body 42 connected in spaced relation by means of screw 44. The cam block body 42 is provided with a threaded hole 46 sized to fit the threads 48 on adjusting rod 20. In assemblying the cam block assembly 38 onto the cam plate 12, the cam block body 42 is threaded onto adjusting rod 20 as shown in FIGS. 2 and 5. After this, the cam block head 40 is positioned on the other face of cam plate 12 in alignment with the slot 18 to threadably received screw 44 passing the slot 18 as illustrated in FIG. 3. Upon the tightening of this screw the faces of the cam block head and cam block body facing the respective surfaces of the cam plate are drawn snugly up thereagainst. This gripping of the cam plate 12 between the faces of the cam block head 40 and cam block body 42 will take the strain off the interengaging threads of the adjusting rod 20 and the cam block body 42.

The cam block head 40 comprises two members 50 and 52 with a rectangular hole 54 formed therebetween. These two members 50 and 52 are held together by means of screws 56 and 58, which also serve to maintain grip on strip cam element 30 passing through the hole 54.

The use of the adjustable cam assembly is quite simple, after assembling the device to assume the organization shown in the drawing, adjustment of the cam element 30 is made as follows: The length of the cam element 30 is adjusted by loosening screws 56 and 58 and passing the cam element 30 through the hole 54 to obtain the desired length between the cam block head 40 and the point when the cam element is secured to cam plate 12 by mounting block 32. After this, screws 56 and 58 are tightened to retain the desired cam element length. Next the adjusting rod 20 is rotated to move the cam block body 42 across the cam plate to obtain the desired cam contour. Next, the cam assembly is put into action with the cam follower 70 (FIG. 2) riding on cam element 30.

The choice of materials, as well as shapes and sizes of the respective components, is a matter of mechanical expediency and should be considered accordingly.

I claim:
1. An adjustable cam assembly comprising:
   a cam plate,
   a strip spring cam element adjustably mounted on the cam plate,
   the cam plate having a slot therein,
   a threaded adjusting rod rotatably mounted on the cam plate adjacent the slot in said plate,
   a cam block assembly threadedly carried by the adjusting rod for reciprocation therealong,
   one end of the cam element being affixed to the cam plate at a point spaced from the plate slot, the other end of the cam element being adjustably received by the cam block assembly whereby the contour of the cam element is varied by changing the length of the cam element between its fixed point and the cam block assembly and by the position of the cam block assembly on the adjusting rod.

2. The invention as set forth in claim 1 and wherein the cam plate slot is longitudinal and the threaded adjusting rod is parallel thereto.

3. The invention set forth in claim 2 and wherein the cam plate is semi-circular and flat.

4. An adjustable cam assembly comprising:
a semi-circular cam plate,
a hub affixed to the plate for rotatably mounting same,
a strip spring cam element adjustably mounted on the cam plate,
the cam plate having a longitudinal slot therein,
a threaded adjusting rod rotatably mounted on the cam plate parallel with the longitudinal slot in said plate,
a cam block assembly having a head portion and a body portion with a threaded hole therein sized to threadedly fit on the adjusting rod reciprocably carried on the cam plate with the body portion being threadedly mounted on the adjusting rod on one face of the cam plate and the head portion on the other cam plate face,
one end of the spring cam element being affixed to the cam plate adjacent its periphery at a point spaced from the plate slot, the other end of the spring cam element being adjustably received by the cam block head whereby the contour of the cam element is varied by changing the length of the cam element between its fixed point and the cam block head and by the position of the cam block body on the adjusting rod.

* * * * *